United States Patent [19]
Fillion

[11] 4,078,475
[45] Mar. 14, 1978

[54] FLOW REGULATOR

[75] Inventor: Pierre Christian Fillion, Nanteuil-le-Haudouin, France

[73] Assignee: Poclain, Le Plessis-Belleville, France

[21] Appl. No.: 697,683

[22] Filed: Jun. 18, 1976

[30] Foreign Application Priority Data
Jul. 15, 1975 France ................. 75 22101

[51] Int. Cl.² .............. F15B 11/08; F15B 13/042
[52] U.S. Cl. .................................. 91/420; 91/452; 137/87
[58] Field of Search ........... 91/420, 452; 137/87, 137/102

[56] References Cited
U.S. PATENT DOCUMENTS

| | | | |
|---|---|---|---|
| 2,477,669 | 8/1949 | Stephens | 91/436 X |
| 2,608,824 | 9/1952 | Kirkham | 91/420 X |
| 2,991,759 | 7/1961 | Pilch | 91/420 X |
| 3,074,384 | 1/1963 | Pilch | 91/420 |
| 3,198,088 | 8/1965 | Johnson et al. | 91/420 |
| 3,523,490 | 8/1970 | Bianchetta | 91/420 |
| 3,913,453 | 10/1975 | Parquet | 91/420 |

FOREIGN PATENT DOCUMENTS
| | | | |
|---|---|---|---|
| 36,296 | 10/1966 | Japan | 91/420 |

*Primary Examiner*—Irwin C. Cohen
*Attorney, Agent, or Firm*—Mason, Fenwick & Lawrence

[57] ABSTRACT

A flow regulation device includes a main regulator connected to the exhaust pipe and delivery pipe of a fluid motor having a valve controlled by the feed pressure to the motor for varying flow permitted from the motor; flow from the valving means passes through a restriction with pressure between the valve and the restriction tending to close the valve. A supplemental valve opens to shunt flow around the restriction following opening of the first valve with the invention being used for the functional control of a winch.

4 Claims, 6 Drawing Figures

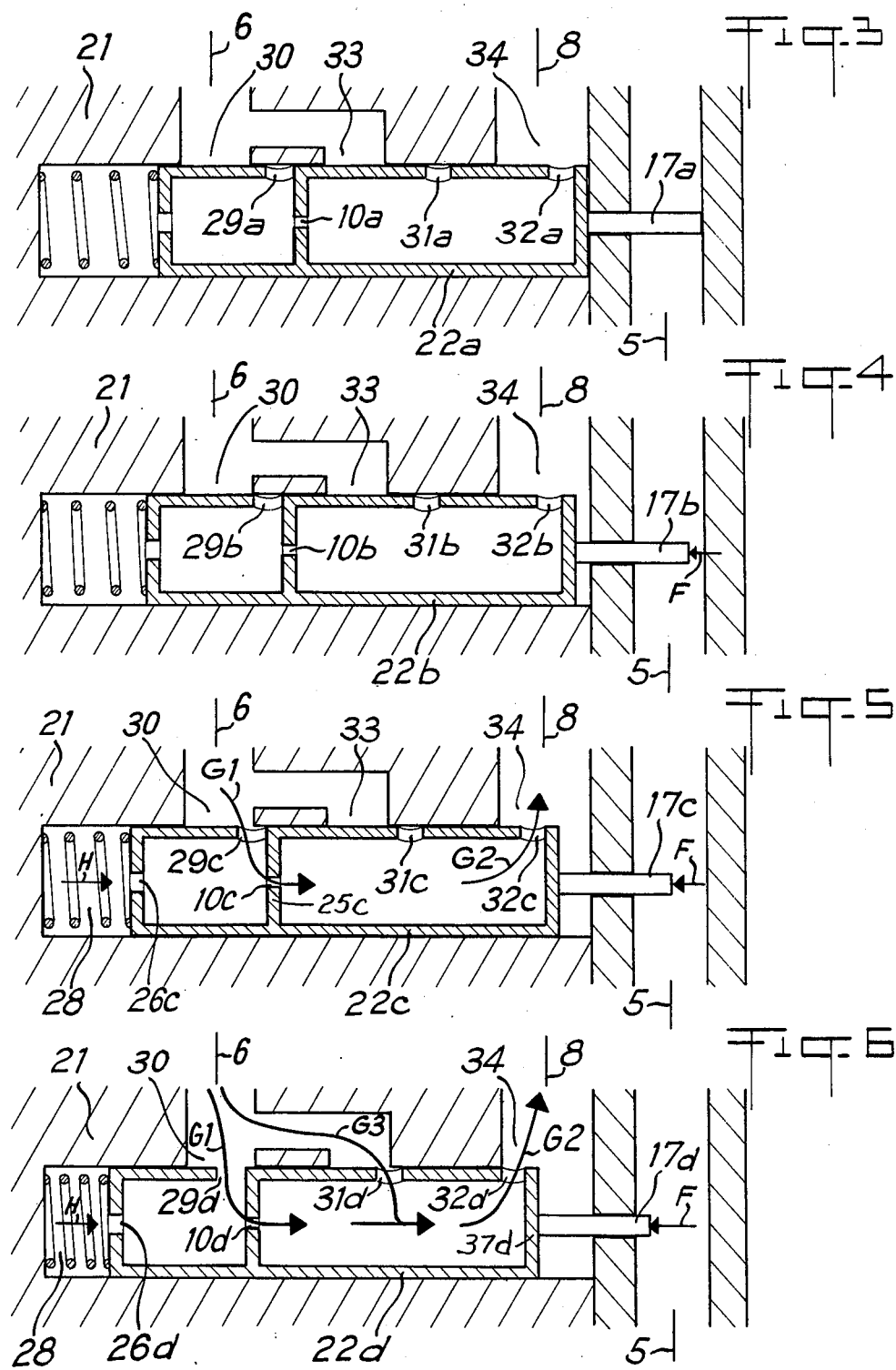

FLOW REGULATOR

The present invention relates to a flow regulation device.

Devices are already known for regulating the flow delivered by a motor, such as the drive motor of a hydraulic winch, whose opening is controlled by the feed pressure of said motor.

The main drawback of the known regulators lies in their functional instability, and it is an object of the invention to propose a stable device not presenting the said disadvantage.

To this end, the invention relates to a flow regulation device constituted by a main regulator, which is connected to the delivery or feed pipe and to the exhaust pipe of a fluid motor and includes valving means which varies exhaust flow from the exhaust pipe over a substantial range under the control of the input feed pressure to the motor and the pressure existing downstream of the valving means but upstream of a restriction through which all or part of the flow passes. Further control is provided by auxiliary or complementary valving means which, when opened subsequent to the opening of the first valving means, serves to bypass exhaust flow around the restriction. A compression spring and the pressure of fluid between the valving means and the restriction tend to close the valving means and the auxiliary valving means while increased pressure in the delivery pipe and downstream of the restriction tends to open both of the valving means so that the opening of said valve follows, with a time lag, the opening of said main regulator. The mobile members of the valve and of the main regulator are advantageously coupled mechanically.

The invention will be more readily understood on reading the following description with reference to the accompanying drawings, in which:

FIG. 1 diagrammatically shows a device in accordance with the invention.

FIGS. 3 to 6 show four successive configurations of the device of FIG. 2, in the course of its opening.

Figure 1:
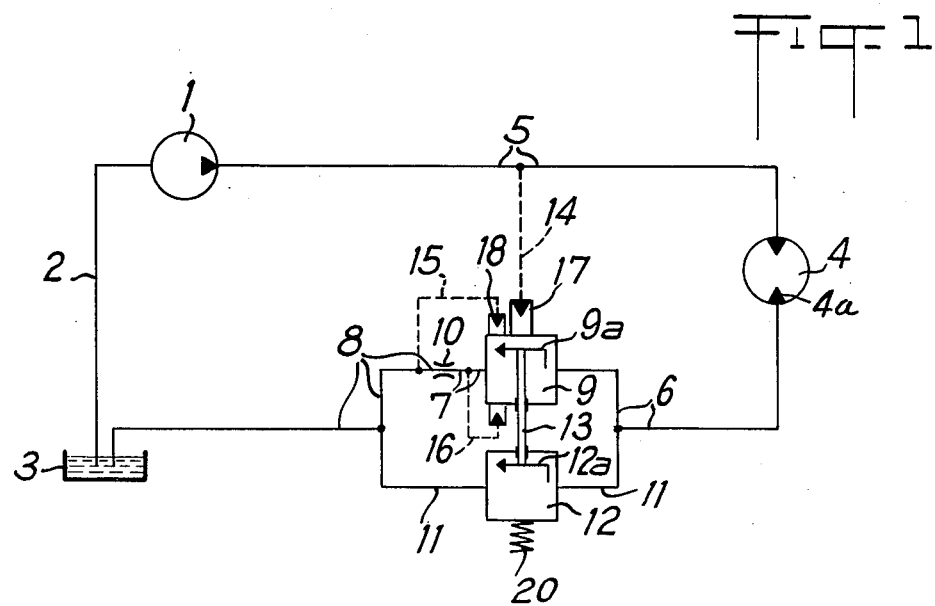

Referring now to the drawings, the circuit shown in FIG. 1 comprises:

a pump 1 connected via its suction pipe 2 to a fluid tank 3, a hydraulic motor 4 which is connected to the delivery pipe 5 of the pump 1, the exhaust pipe of the motor 4, which connects said motor to the tank 3 and which comprises three successive sections 6, 7 and 8.

The section 6 connects the exhaust orifice 4a of the motor 4 to the inlet connection of a flow regulator 9. The section 7 connects the outlet connection of the regulator 9 to the inlet of a restriction 10. Finally, the section 8 constitutes a sump return pipe which connects the outlet of the restriction 10 to the tank 3.

It will be noted that a pipe 11 is connected on the one hand to the section 6, on the other hand to section 8, whilst a valve 12 is disposed in this pipe 11. It is also to be noted that the mobile members 9a and 12a of the regulator 9 and valve 12 are mechanically coupled by a connection 13 which causes the offset opening of the valve 12 to correspond to the opening of the regulator 9. Mobile member 9a comprises an exhaust valving means for fluid from exhaust pipe 6 while mobile member 12a comprises an auxiliary valving means operable only after means 9a is fully open for a purpose which will become apparent. The constitution of the regulator 9 and valve 12 and their functioning will be more completely explained hereinafter with reference to FIGS. 2 to 6.

Three hydraulic connections are shown schematically by pipes 14, 15, 16 of which:

pipe 14 connects the pipe 5 to the main jack 17 for controlling the opening of the regulator 9, pipe 15 connects the section 8 to an auxiliary jack 18 acting on the mobile member 9a in the same direction as jack 17, and pipe 16 connects the section 7 to a complementary jack 19 which is coupled to the mobile member 9a and whose effect causes the closure of the regulator 9, associated in this action with a spring 20 for return to closed position of regulator 9 and valve 12.

Figure 2:
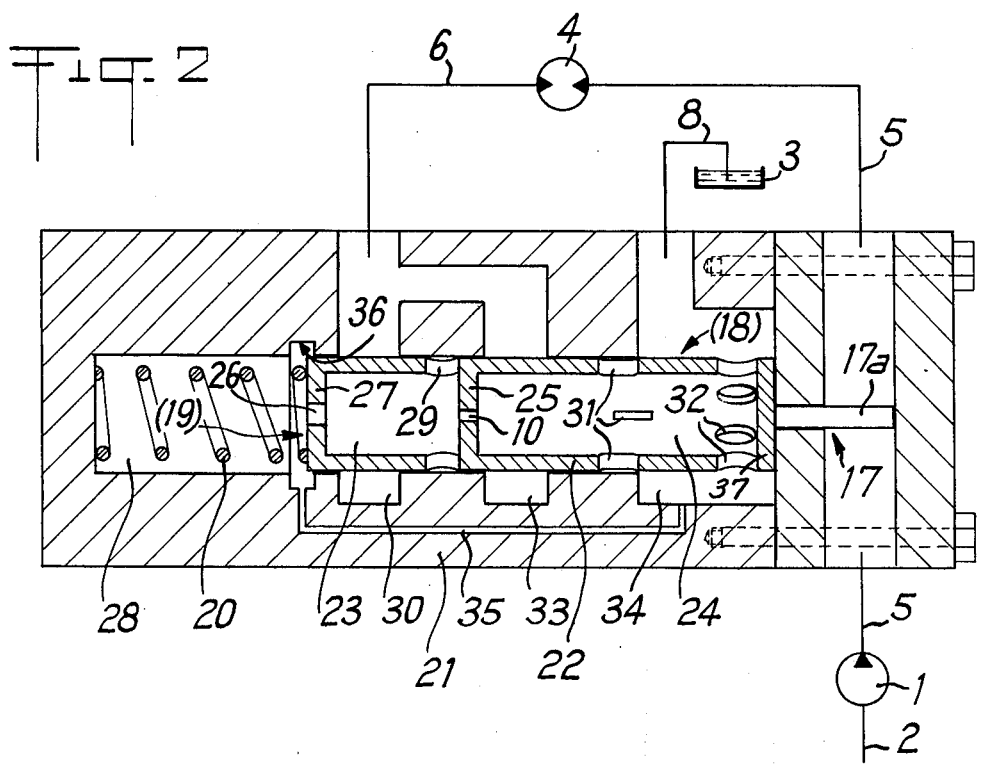
FIG. 2 is a section through a device in accordance with the invention.

In practice, the assembly of the regulator 9 and valve 12 is made as shown in FIG. 2 as a monobloc device constituted by a body 21 in which a slide valve 22 is mounted to slide.

The slide valve 22 comprises a valve spool including first and second chambers 23 and 24 which are separated by a transverse wall 25 through which the restriction 10 passes.

In addition, the upstream chamber 23 communicates on the one hand, via an orifice 26, with which its end wall 27 is provided, opposite the wall 25, with a chamber 28 made in the body 21 and in which is disposed the spring 20 interposed between said body 21 and said slide valve 22. The chamber 23 is in addition provided with holes 29 made in its cylindrical wall and capable of placing it in communication with a groove 30 in the body 21, to which groove 30 the exhaust pipe 6 is permanently connected.

The cylindrical wall of the chamber 24 is provided with two series of holes 31 and 32, holes 31 being capable of placing it in communication with a groove 33 in the body 21 to which the pipe 6 is permanently connected and the holes 32 placing it in permanent communication with a groove 34 in the body 21, permanently connected to the section 8 of the exhaust pipe.

The various elements schematised in FIG. 1 are found again in the embodiment of FIG. 2, it being understood that the mobile members 9a and 12a and the mechanical connection 13 constitute in the present case a single member: the slide valve 22. It is to be noted that it is the piston 17a of the jack 17 which acts on one end of the slide valve 22 to establish communication of the holes 29 with the groove 30 and, possibly the subsequent communication of the holes 31 with the groove 33, against the action of the spring 20. The existence, in body 21, of the pipe 35 which connects a groove 36 of the chamber 28 with groove 34 is also to be noted.

It should be understood that the holes 29 constitute a first group of radial apertures which act as a first exhaust valving means performing the function of member 9a of FIG. 1 and that upstream chamber 23 performs the function of pipe 7 of FIG. 1. Similarly, holes 31 constitute a second group of radial apertures which serve as an auxiliary valving means to perform the function of member 12a of FIG. 1 while holes 32 serve as simple discharge openings. In operation, pressure in delivery pipe 5 above a predetermined level moves the valve spool 22 to the left to open the first exhaust valving means 29 and then subsequently open the auxiliary valving means 31 in a manner to be discussed in detail hereinafter.

The functioning obtained and its advantages will now be set forth with reference to simplified FIGS. 3 to 6, showing four successive configurations ranging from complete closure of the slide valve (FIG. 3) to complete opening of said slide valve (FIG. 6).

With reference to FIG. 3, the slide valve is disposed at 22a and its various holes are located at 29a, 31a, 32a, the restriction being at 10a and the piston of the jack 17 at 17a. The holes 29a are isolated from groove 30 in the same way as the holes 31a are isolated from groove 33. The pressure in delivery pipe 5 is zero.

With reference to FIG. 4, it will be noted that the effect of the non-zero pressure of the fluid in pipe 5 has caused a displacement of the slide valve to 22b in the direction of arrow F, the piston of the jack 17 being located at 17b and the various orifices being disposed at 29b, 31b and 32b. The restriction is at 10b. Neither of the orifices 29b and 31b communicates yet with corresponding groove 30, 33, although this communication is on the point of being established between orifice 29a and groove 30.

With reference to FIG. 5, the various elements of the slide valve 22c have come to 29c, 31c, 32c (holes), 10c (restriction), the piston of the jack 17 itself being disposed at 17c. The orifices 29c are now uncovered with the result that the fluid from section 6 follows arrow G1 through orifices 29c and restriction 10c and arrow G2 through orifices 32c to return, via section 8, to tank 3. The drop in pressure in the restriction 10c brings about a difference in pressure on either side of the wall 25c and an effect H of the pressure of the fluid contained in the chamber 28 on the slide valve 22c which is opposite the direction of arrow F and which tends to bring about the closure of the orifices 29c, the fluid following arrow G1 having in fact penetrated into chamber 28 via orifice 26c. The orifices 31c remain obturated. The fluid is in addition wire-drawn during its passage through 29c where part of the energy of the fluid is dissipated.

Finally, FIG. 6 shows the ultimate phase of the opening, in which the orifices 29c are uncovered, as well as orifices 31d. The fluid coming from section 6 may therefore follow not only the path of arrow G1 to pass through orifice 29d and the restriction 10d, but also the path of arrow G3 to pass through orifices 31d. This fluid still escapes through orifices 32d of the slide valve 22d (arrow G2). Before passing through the restriction 10d, the fluid which has passed through orifices 29d has also filled chamber 28 by passing through orifice 26d. The piston of jack 17 is now disposed at 17d. There again, the fluid passing through holes 29d and 31d is noted to be wire-drawn.

The functioning of the device according to the invention has been described, and its advantages are as follows:

When holes 29c (FIG. 5) are uncovered, there is firstly a counter-reaction of the fluid which acts in the direction of arrow H and opposes the main action of opening transmitted by piston 17c (arrow F). In this way, there is a braking of the opening movement, which means a good functional stability of the flow regulator during opening.

It is to be noted that the pressures which act in jacks 18 and 19 react in fact on the end faces or walls 27 and 37 (of equal surface values) of the slide valve 22. The effect of these pressures is therefore linked solely with the difference in pressure, and therefore solely with the drop in pressure created by the restriction 10. In this way, the pressure of the fluid in section 8 has no influence on the functioning and stability obtained. In particular, this section 8 could well be connected to a user circuit instead of tank 3, without this resulting in any change in the functioning of the regulator 9 and valve 12.

Finally, the embodiment adopted, which unites in one body 21 and one slide valve 22 the regulator 9 and valve 12 and their mobile members, results in a desirable compactness and mechanical strength.

Finally, it is to be noted that the extent of the range of exhaust flows that may be checked is considerable since the functioning, which is satisfactory for slight and average flow (arrow G1, FIG. 5), remains satisfactory for considerable flow (arrows G1 and G3, FIG. 6), in view, in this latter configuration, of the bypass G3 of part of the flow, which does not pass through the restriction 10d. By way of indication, whilst it is already difficult to produce a conventional flow regulator having a satisfactory functioning of flows varying in a ratio of 1 to 5, the device described permits a satisfactory control of the flows varying in a ratio of 1 to 20.

The invention is not limited to the embodiment which has been described, but covers on the contrary all modifications which might be made thereto without departing from its scope. In this respect, the motor 4 could be replaced by a linear or rotary jack having, of course, a driving function.

What is claimed is:

1. A flow regulating and motor overspeed preventing fluid power system including a fluid motor having a delivery pipe delivering fluid to the motor and an exhaust pipe receiving spent fluid from the motor, regulator means connected to said delivery pipe, said exhaust pipe and a sump return pipe, said regulator means including exhaust valving means for progressively permitting flow from said exhaust pipe to said sump return pipe under the control of the pressure in said delivery pipe when pressure in the delivery pipe exceeds a predetermined value, biasing means urging said exhaust valving means toward a minimum flow permitting position, a flow restriction means positioned downstream of said exhaust valving means between said exhaust valving means and said sump return pipe for creating a pressure drop therebetween so that fluid from said exhaust valving means flows through said flow restriction means to said sump return pipe, pressure responsive means for urging said valving means toward said minimum flow permitting position with a force in proportion to the pressure of fluid between said valving means and said flow restriction means, additional pressure responsive means urging said valving means toward its maximum flow permitting position with a force in proportion to the pressure of fluid downstream of said flow restriction means, auxiliary valving means mechanically connected to said exhaust valving means for communicating said exhaust pipe to said sump return pipe at a location downstream of said restriction means so as to partially bypass said restriction means after a time lag following opening of said exhaust valving means, wherein said exhaust valving means and said auxiliary valving means respectively comprise first and second radial openings in a valve spool member having an upstream internal chamber and a downstream internal chamber with which said first and second radial openings respectively commute, a wall separating said internal chambers and wherein said flow restriction means comprises an opening in said wall and additionally including outflow openings in said valve spool communicating said downstream internal chamber with said sump return pipe.

2. The fluid power system of claim 1 wherein said valve spool member is of cylindrical configuration having first and second end walls and is mounted for reciprocation in a valve body, said first end wall being positioned in a closed chamber in said valve body, a passageway in said first end wall communicating said first internal chamber with said closed chamber whereby said first end wall comprises said pressure responsive means.

3. The invention of claim 2 wherein said valve body includes two inflow openings spaced axially with respect to said valve spool and both connected to said exhaust pipe, one of said openings being positioned to fully communicate with said first radial opening as said valve spool is moved from a closed position toward an open position and the other of said inflow openings being positioned so that it communicates with said other radial opening only when said first radial opening is in full communication with said one opening.

4. A flow regulating and motor overspeed preventing fluid power system including a fluid motor having a delivery pipe delivering fluid to the motor and an exhaust pipe receiving spent fluid from the motor, regulator means connected to said delivery pipe, said exhaust pipe and a sump return pipe, said regulator means including exhaust valving means for progressively permitting flow from said exhaust pipe to said sump return pipe under the control of the pressure in said delivery pipe when pressure in the delivery pipe exceeds a predetermined value, biasing means urging said exhaust valving means toward a minimum flow permitting position, a flow restriction means positioned downstream of said exhaust valving means between said exhaust valving means and said sump return pipe for creating a pressure drop therebetween so that fluid from said exhaust valving means flows through said flow restriction means to said sump return pipe, and pressure responsive means for urging said valving means toward said minimum flow permitting position with a force in proportion to the pressure of fluid between said valving means and said flow restriction means, wherein said regulator means includes a valve body, said valving means being part of a valve spool mounted for axial reciprocation in said valve body between a first or closed position in which said valving means is closed to a second or open position in which said valving means is opened, said valve body including first and second inflow openings terminating at axially spaced locations with respect to and adjacent said valve spool and both being connected to said exhaust pipe, an outflow opening in said valve body connected to said sump return pipe, said valve spool including an upstream internal chamber and a downstream internal chamber, a transverse internal wall separating said upstream and downstream internal chambers, said flow restriction means comprising a restriction opening in said transverse internal wall, said valving means comprising a first radial opening in said valve spool communicating with said upstream internal chamber, auxiliary valving means comprising a second radial opening in said valve spool communicating with said downstream internal chamber, said first radial opening being positioned in blocked relationship with respect to said valve body when said valve spool is in its first position so that subsequent movement of said valve body toward its open position progressively moves said first radial opening into full communication with a first of said two inflow openings, said second radial opening being blocked by said valve body when said valve spool is in said closed position and continuing to be blocked by said valve body as said valve spool moves toward its open position until first radial opening is in full communication with said first inflow opening, said second radial opening then moving progressively into communication with said second inflow opening so that said first and second radial openings are in full communication with said two inflow openings when said valve spool is in its open position to permit maximum flow from said exhaust pipe, flow from said first inflow opening passing through said first radial opening and then through said restriction opening in said internal wall to said downstream chamber with flow from said second inflow opening bypassing said restriction opening and going directly into said downstream chamber, all flow from said downstream chamber being through discharge openings and said downstream chamber communicating with said outflow opening connected to said sump return pipe, said valve spool having first and second end walls, said first end wall having an opening extending therethrough and communicating with an internal chamber facing said first end wall, said biasing means comprising spring means in said internal chamber engaged with said first end wall and tending to move said valve spool member toward its closed position and piston means extending from said second end wall into said delivery pipe so that pressure in said delivery pipe tends to move said valve spool towards its open position.

* * * * *